United States Patent

[11] 3,628,109

[72] Inventor Alan J. R. Plummer
London, England
[21] Appl. No. 877,797
[22] Filed Nov. 18, 1969
[45] Patented Dec. 14, 1971
[73] Assignee Masson Scott Thrissell Engineering Limited, Masson Scott Works Summerstown, London, England
[32] Priority Nov. 28, 1968
[33] Great Britain
[31] 56499/68

[54] ELECTRIC DRIVING UNITS
5 Claims, 1 Drawing Fig.
[52] U.S. Cl. .................................................. 318/11
[51] Int. Cl. .................................................. H02r 7/70
[50] Field of Search .................................... 318/4, 5, 9, 11, 45, 8, 98, 99, 111–113

[56] References Cited
UNITED STATES PATENTS
2,076,202  4/1937  Lewellen et al. ............... 318/11 X
FOREIGN PATENTS
1,071,205  12/1959  Germany ....................... 318/11

Primary Examiner—Benjamin Dobeck
Assistant Examiner—W. E. Duncanson, Jr.
Attorney—Craig, Antonelli and Hill ABSTRACT: An electric driving units for a machine such as a paper cutter comprises two commutator-type electric motors, one driving a first shaft for connection to those parts of the machine presenting substantially constant torque loading and the other driving a second shaft for connection to those parts presenting variable torque loading. A belt drive, preferably with presettable ratio, couples the two shafts and the armature windings of the two motors are connected in series to one common supply, the field windings being connected to another common supply.

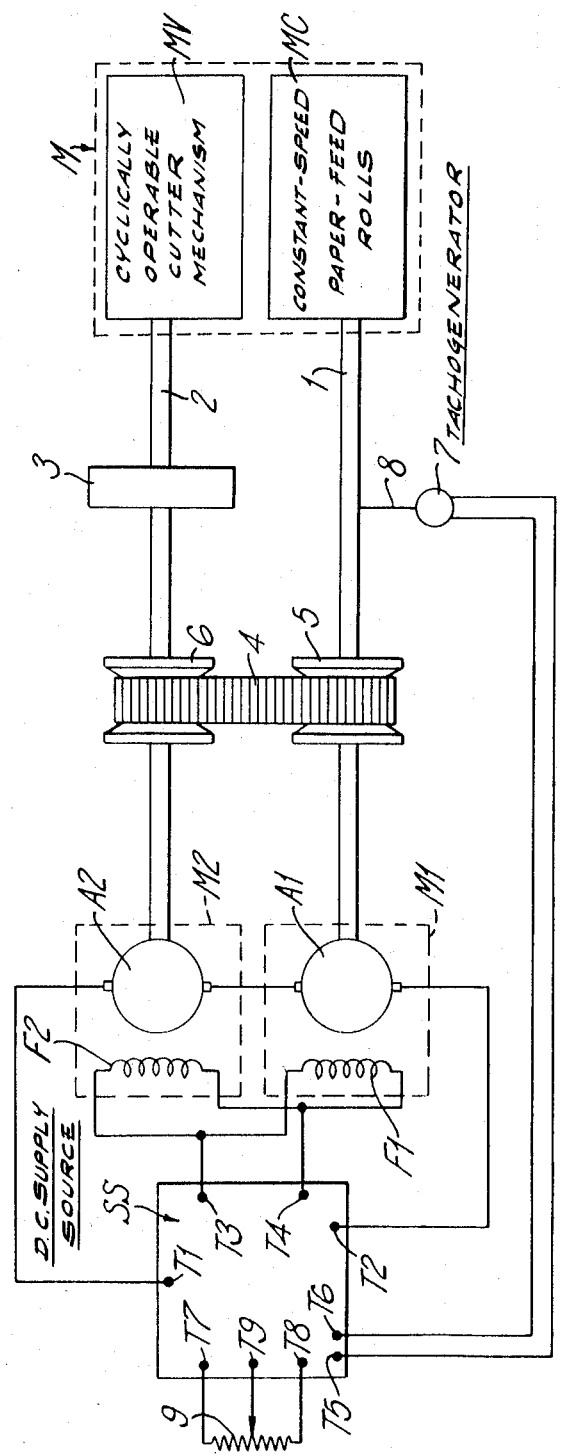

ELECTRIC DRIVING UNITS

This invention relates to machines in which parts presenting a substantially constant torque loading and other parts presenting a torque loading subject to large and repeated (usually cyclic) variations are required to be driven in synchronism; such machines will hereinafter be termed "machines of the type defined," and the invention is especially concerned with electric driving units for such machines.

It is convenient to arrange a machine of the type defined so that it has two input shafts, on of which is coupled to the parts presenting substantially constant torque loading and the other of which is coupled to the parts presenting variable torque loading. An example of such a machine is a paper cutter, in which constant loading is provided by parts serving to feed a paper web at constant speed while severely variable loading is provided by the cutting mechanism which operates cyclically to make transverse cuts across the web at regular intervals.

Conventionally a paper cutter is provided with a prime mover (usually an electric motor) connected to one of its inputs shafts, and a variable ratio transmission between the two input shafts. The transmission ratio is changed when it is desired to alter the length of the cut sheets produced, hence the transmission must be of a type which permits rapid change of ratio (to avoid uneconomic machine stoppages) and, preferably, offering an infinitely variable velocity ratio over a suitable range. To meet these requirements, it has been found convenient to use a Reeves beltdrive with variable-diameter pulleys between the two input shafts, the ratio being readily variable by means of adjustment of the pulley diameters. However, it has been found that such a transmission has to be of uneconomically large power rating, whichever input shaft is connected to the prime mover.

According to the invention, there is provided an electric driving unit for a machine of the type defined, said unit having a first shaft for connection to the parts of the machine presenting substantially constant torque loading and a second shaft for connection to the parts of the machine presenting varying torque loading, a drivebelt extending between pulleys secured to said first and second shafts to provide a drive connection therebetween, and first and second commutator-type electric motors drivingly connected to said first and second shafts respectively, said motors having armature windings connected in series to one common electric supply and field windings connected to another common electric supply.

Preferably the belt and pulleys constitute a "Reeves drive," with both said pulleys of adjustable diameter to allow the ratio between the speeds of the two shafts to be preset suitably for various machine settings. It is generally convenient if the common supply for the armature windings of a variable-voltage source and the other common supply (for the field windings) a fixed voltage source.

The motors will normally be DC motors and will be basically of the shunt field type; however, they may with advantage in many instances be compound-wound, i.e. may also have series field windings providing some modification of their characteristics.

In order that the invention may be well understood a preferred embodiment thereof will now be described with reference to the accompanying drawing which is a schematic diagram of a driving unit embodying the invention.

In the drawing, a machine to be driven by the unit shown is indicated by a block M having two sections—section MC represents a part of the machine presenting a constant torque loading to a first shaft 1 of the unit and section MV represents a part of the machine presenting a variable torque loading to a second shaft 2 of the unit. The shaft 2 carries a flywheel 3 to smooth in some degree the variation in its torque loading.

The machine M may for example be a paper cutter, section MC representing the constant-speed paper-feed rolls and section MV representing the cyclically operable cutter mechanism.

A drivebelt 4 (preferably a so-called Reeves belt) is carried on pulleys 5, 6 respectively secure to shafts 1, 2 to provide a drive connection between said shafts. The pulleys 5, 6 are both of variable diameter, so that the velocity ratio of said drive connection may be preset in accordance with the work the machine is to do. For example, if the machine is a paper cutter the cutter mechanism will be required to operate faster relative to the paper-feed rolls when short sheets are being cut than when long sheets are required.

An electric motor M1 has its armature A1 connected to shaft 1 and also a similar electric motor M2 has its armature A2 connected to the shaft 2. The armatures A1, A2 are electrically connected in series to one pair of output terminals T1, T2 of a DC supply source SS. Motors M1, M2 have field windings F1, F2 connected in parallel to further output terminals T3, T4 of the source SS.

A tachometer generator 7 is mechanically coupled at 8 to shaft 1, and electrically connected to input terminals T5, T6 of source SS. A control potentiometer 9 is connected to terminals T7, T8, T9 of the unit SS.

Considering the operation of the machine, we will first ignore the presence of tachometer generator 7 and potentiometer 9, i.e. it will be assumed that constant voltages are delivered to the pairs of output terminals T1, T2 and T3, T4. The motor fields F1, F2 are therefore equally energized, and as the same current is carried through the armatures A1, A2 the motors M1, M2 must generate equal torques, (assuming in this instance that the two motors are identical). Variations of the torque loading imposed on shaft 2 by portion MV of the machine M which, in spite of the presence of flywheel 3, tend to cause motor M2 to slow or accelerate will of course cause changes in armature current and hence changes in the torque output of motor M2, but the armature current of motor M1 necessarily undergoes the same changes and hence the torque output of this motor varies similarly. The net effect is that any change in the torque loading on shaft 2 is balanced by changes in the torque outputs of both motors. If for example the loading of shaft 2 rises, motor M2 tends to slow and its torque output increases; the torque output of motor M1 also increases— as the torque loading on shaft 1 is unchanged, the increased output from motor M1 passes to shaft 2 via belt 4, to assist in stabilizing the system. However, it will be appreciated that the belt 4 is never required to carry more than a portion of the output of one of the two motors, hence the belt 4 and pulleys 5, 6 need not be expensive heavy duty components.

The tachometer generator 7 and potentiometer 9 provide electrical indications of the actual speed of shaft 1 and of the desired speed of said shaft respectively; the source SS includes known circuitry (not shown) to compare these indications and adjust the voltage delivered via terminals T1, T2 (the common armature supply) and/or terminals T3, T4 (the common field supply) in such a sense as to maintain the speed of shaft 1 at a desired value represented by the setting of potentiometer 9.

The source SS consists of any convenient type of DC generator or converter, together with a thyristor regulator unit; a suitable regulator unit for powers up to 75 h.p. is the "Stardrive" regulator-type SRD75E supplied by Thorn Automation Limited.

Various changes or modifications in details of the apparatus described may be made without departing from the scope of the invention; for example, the flywheel 3 may be omitted and/or the tachometer generator 7 and potentiometer 9 may be omitted, with or without their replacement by some other form of speed stabilizing device.

I claim:

1. An electric driving unit for a machine in which parts presenting a substantially constant torque loading and other parts presenting a torque loading subject to large and repeated variations are required to be driven in synchronism, said unit having a first shaft for connection to the parts of the machine presenting substantially constant torque loading and a second shaft for connection to the parts of the machine presenting variable torque loading, a drivebelt extending between pulleys secured to said first and second shafts to provide a drive connection therebetween, and first and second commutator-type electric motors drivingly connected to said first and second shafts respectively, said motors having armature windings connected in series to one common supply and field windings connected to another common supply.

2. An electric driving unit as claimed in claim 1, in which said belt and pulleys constitute a Reeves drive, both pulleys being adjustable to vary their diameters so that the ratio between the speeds of the two shafts is presettable.

3. An electric driving unit as claimed in claim 1, in which said motors are DC motors and are basically of the shunt field type.

4. An electric driving unit as claimed in claim 1, including a flywheel carried on the second shaft.

5. An electric driving unit as claimed in claim 1, including a DC source providing both said common electric supplies, a tachometer generator mechanically coupled to the first shaft and electrically connected to said DC source, and a control potentiometer connected to said DC source.

* * * * *